United States Patent
Park et al.

(10) Patent No.: US 12,413,780 B2
(45) Date of Patent: Sep. 9, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Yousun Park, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 18/264,661

(22) PCT Filed: Jan. 26, 2022

(86) PCT No.: PCT/KR2022/001351
§ 371 (c)(1),
(2) Date: Aug. 8, 2023

(87) PCT Pub. No.: WO2022/169176
PCT Pub. Date: Aug. 11, 2022

(65) Prior Publication Data
US 2024/0121435 A1    Apr. 11, 2024

(30) Foreign Application Priority Data
Feb. 8, 2021    (KR) .................... 10-2021-0017654

(51) Int. Cl.
*H04N 19/597* (2014.01)
*H04N 19/174* (2014.01)
*H04N 19/70* (2014.01)
*H04N 19/86* (2014.01)

(52) U.S. Cl.
CPC ......... *H04N 19/597* (2014.11); *H04N 19/174* (2014.11); *H04N 19/70* (2014.11); *H04N 19/86* (2014.11)

(58) Field of Classification Search
CPC .... H04N 19/174; H04N 19/119; H04N 19/86; H04N 19/70; G06T 9/00
See application file for complete search history.

(56) References Cited

U.S. PATENT DOCUMENTS

| | | | |
|---|---|---|---|
| 11,217,037 B2* | 1/2022 | Park | G06T 17/00 |
| 11,601,675 B2* | 3/2023 | Park | H04N 19/597 |
| 11,743,498 B2* | 8/2023 | Zhang | H04N 19/1883 |
| | | | 375/240.12 |
| 12,131,509 B2* | 10/2024 | Han | G06T 9/00 |
| 2022/0094980 A1* | 3/2022 | Joshi | H04N 19/167 |
| 2024/0046526 A1* | 2/2024 | Najaf-Zadeh | G06T 5/80 |
| 2024/0121435 A1* | 4/2024 | Park | H04N 19/174 |

\* cited by examiner

*Primary Examiner* — Tsion B Owens
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

17 Claims, 29 Drawing Sheets

FIG. 6
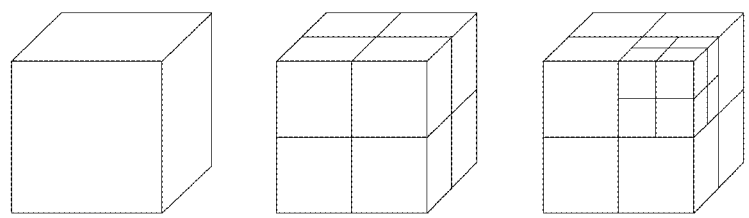
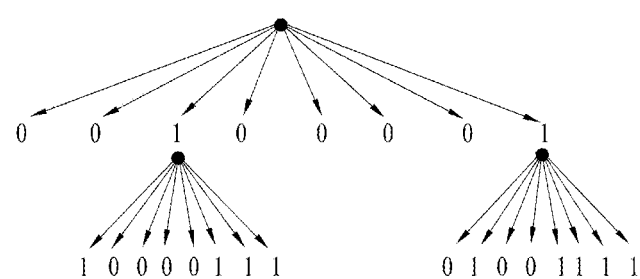

FIG. 7
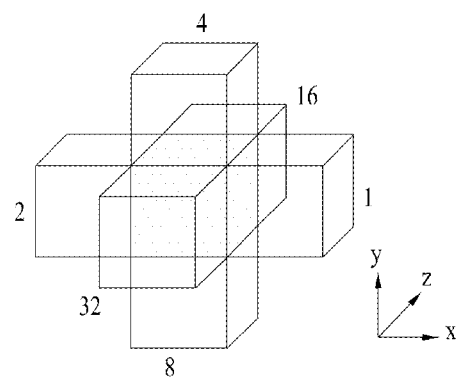
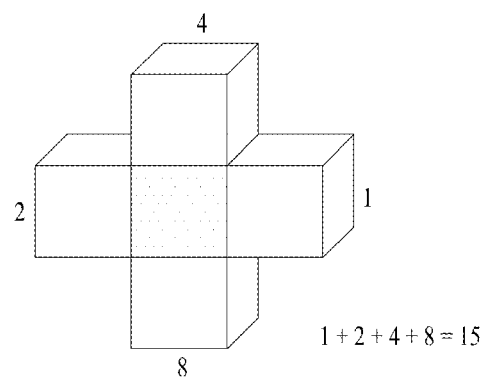

$$17000 \sim c = \frac{1}{m}\sum_{i=1}^{m} p_i$$

$$17001 \sim \sum_{i=1}^{m}(p_i - \bar{p})(p_i - \bar{p})^T$$

$$17002 \sim s = \frac{c'c}{q'}, \ s' = \frac{c'c}{q}$$

FIG. 22

| geometry_data_unit_header( ) { | Descriptor |
|---|---|
| ... | |
| smoothing_slices_use_flag | u(1) |
| slice_partitioning_method | ue(v) |
| for(i = 0; i < slice_partitioning_method[unit_num] ; i++) { | |
| overlapping_region_exist_flag | u(1) |
| smoothing_cancelation_flag | u(1) |
| quantized_distance_xyz | u(3) |
| } | |
| geometry_smoothing_metadata_exit_flag | u(1) |
| if(geometry_smoothing_metadata_exit_flag) | |
| metadata_data_unit() | ue(v) |
| smoothing_clip_flag | u(1) |
| ... | |
| byte_alignment( ) | |
| } | |

FIG. 23

| tile_parameter_set( ) { | Descriptor |
|---|---|
| ... | ue(v) |
| smoothing_tiles_use_flag | u(1) |
| tile_partitioning_method | ue(v) |
| for(i = 0; i < tile_partitioning_method[unit_num] ; i++) { | |
|    overlapping_region_exist_flag | u(1) |
|    smoothing_cancelation_flag | u(1) |
|    quantized_distance_xyz | u(3) |
| } | |
| geometry_smoothing_metadata_exit_flag | u(1) |
| if(geometry_smoothing_metadata_exit_flag) | |
|    metadata_data_unit() | ue(v) |
| smoothing_clip_flag | u(1) |
| ... | |
| } | |

FIG. 24

| geometry_parameter_set( ) { | Descriptor |
|---|---|
| ... | |
| smoothing_use_flag | u(1) |
| smoothing_unit_def | ue(v) |
| for(i = 0; i < smoothing_unit_def[unit_num] ; i++) { | |
| overlapping_region_exist_flag | u(1) |
| smoothing_cancelation_flag | u(1) |
| quantized_distance_xyz | u(3) |
| } | |
| geometry_smoothing_metadata_exit_flag | u(1) |
| if(geometry_smoothing_metadata_exit_flag) | |
| metadata_data_unit() | ue(v) |
| smoothing_clip_flag | u(1) |
| ... | |
| } | |

FIG. 25

| attribute_parameter_set( ) { | Descriptor |
|---|---|
| ... | |
| smoothing_use_flag | u(1) |
| smoothing_unit_def | ue(v) |
| for(i = 0; i < smoothing_unit_def[unit_num] ; i++) { | |
|    overlapping_region_exist_flag | u(1) |
|    smoothing_cancelation_flag | u(1) |
|    quantized_distance_xyz | u(3) |
| } | |
| geometry_smoothing_metadata_exit_flag | u(1) |
| if(geometry_smoothing_metadata_exit_flag) | |
|    metadata_data_unit() | ue(v) |
| smoothing_clip_flag | u(1) |
| ... | |
| } | |

FIG. 26

| geometry_slice_header( ) { | Descriptor |
|---|---|
| ... | |
| smoothing_use_flag | u(1) |
| smoothing_unit_def | ue(v) |
| for(i = 0; i < smoothing_unit_def[unit_num] ; i++) { | |
| overlapping_region_exist_flag | u(1) |
| smoothing_cancelation_flag | u(1) |
| quantized_distance_xyz | u(3) |
| } | |
| geometry_smoothing_metadata_exit_flag | u(1) |
| if(geometry_smoothing_metadata_exit_flag) | |
| metadata_data_unit() | ue(v) |
| smoothing_clip_flag | u(1) |
| ... | |
| } | |

FIG. 27

| metadata_data_unit( ) { | Descriptor |
|---|---|
| rec_geom_diff_value | ue(v) |
| rec_attr_diff_value | ue(v) |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2022/001351, filed on Jan. 26, 2022, which claims the benefit of Korean Application No. 10-2021-0017654, filed on Feb. 8, 2021. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may cover other technical objects that may be inferred by those skilled in the art based on the entire contents disclosed herein.

To achieve these objects and other advantages and in accordance with the purpose of the disclosure, as embodied and broadly described herein, a method for transmitting point cloud data may include encoding the point cloud data, and transmitting a bitstream containing the point cloud data. In another aspect of the present disclosure, a method for receiving point cloud data may include receiving a bitstream containing the point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 17 shows an example of an origin position according to embodiments;

FIG. 22 illustrates a point cloud data reception device according to embodiments;

FIG. 23 shows a bitstream including point cloud data and parameter information according to embodiments;

FIG. 24 shows a sequence parameter set according to embodiments;

FIG. 25 shows a geometry parameter set according to embodiments;

FIG. 26 shows a tile parameter set according to embodiments;

FIG. 27 shows a geometry slice header according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
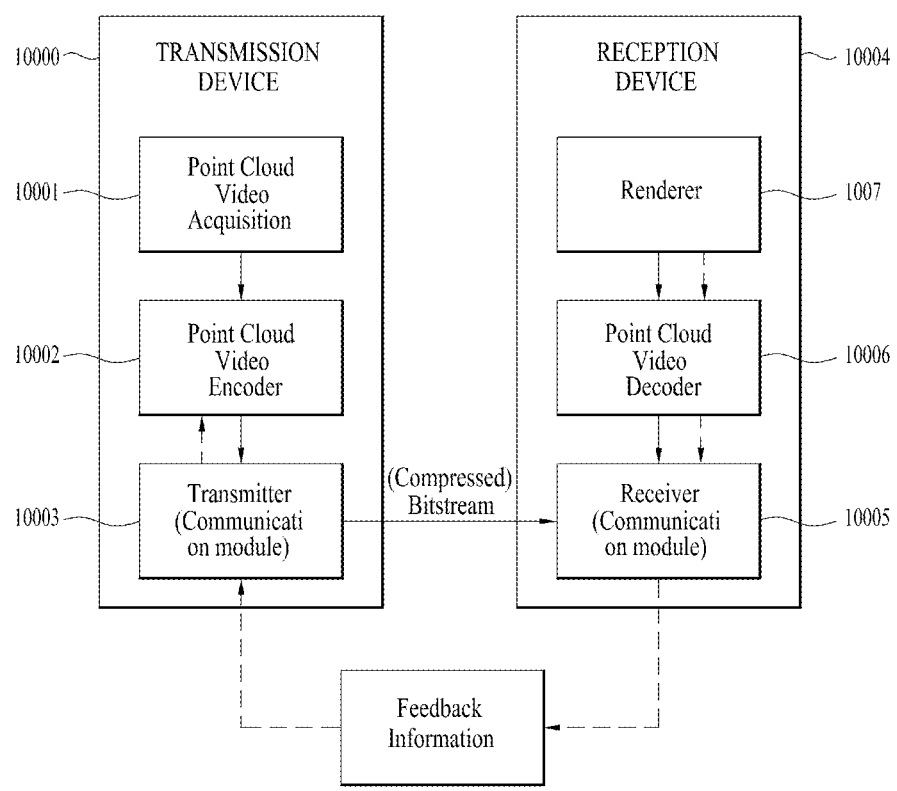
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
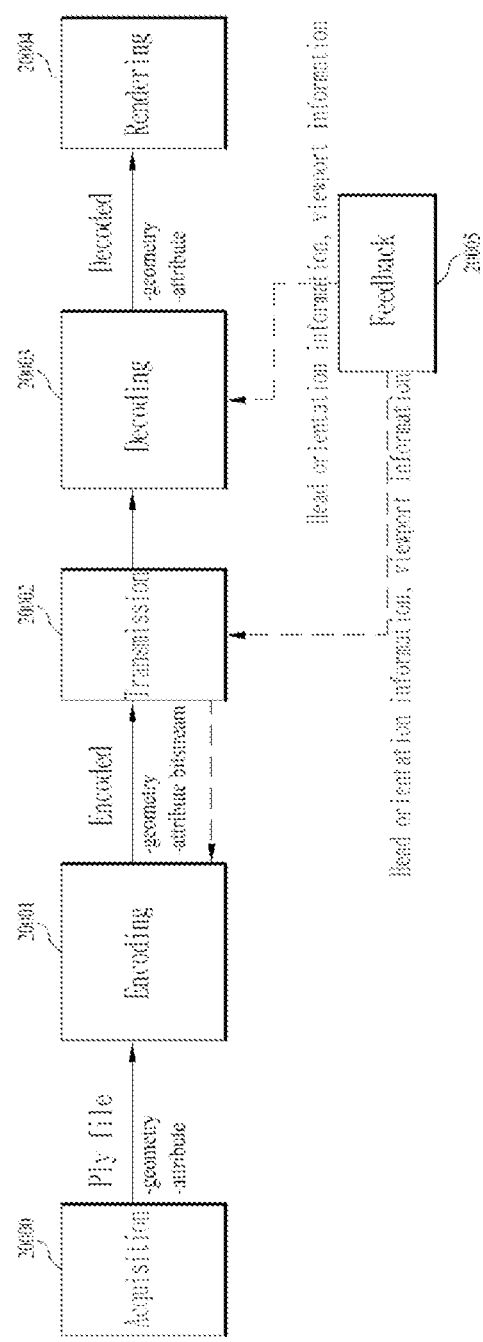
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
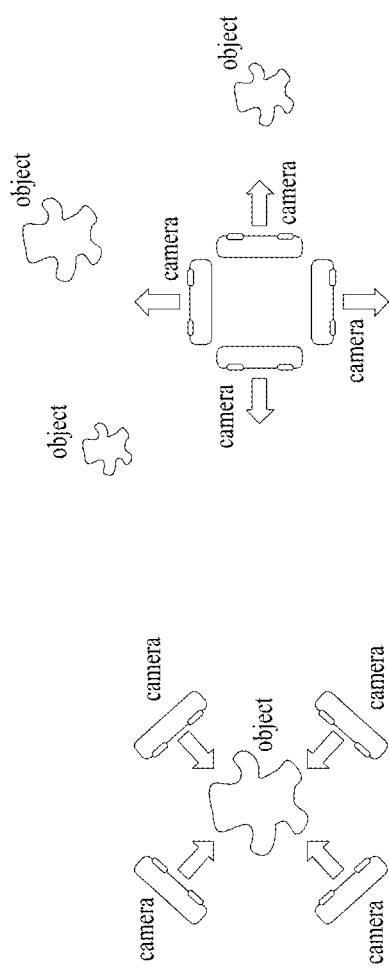
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 and 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
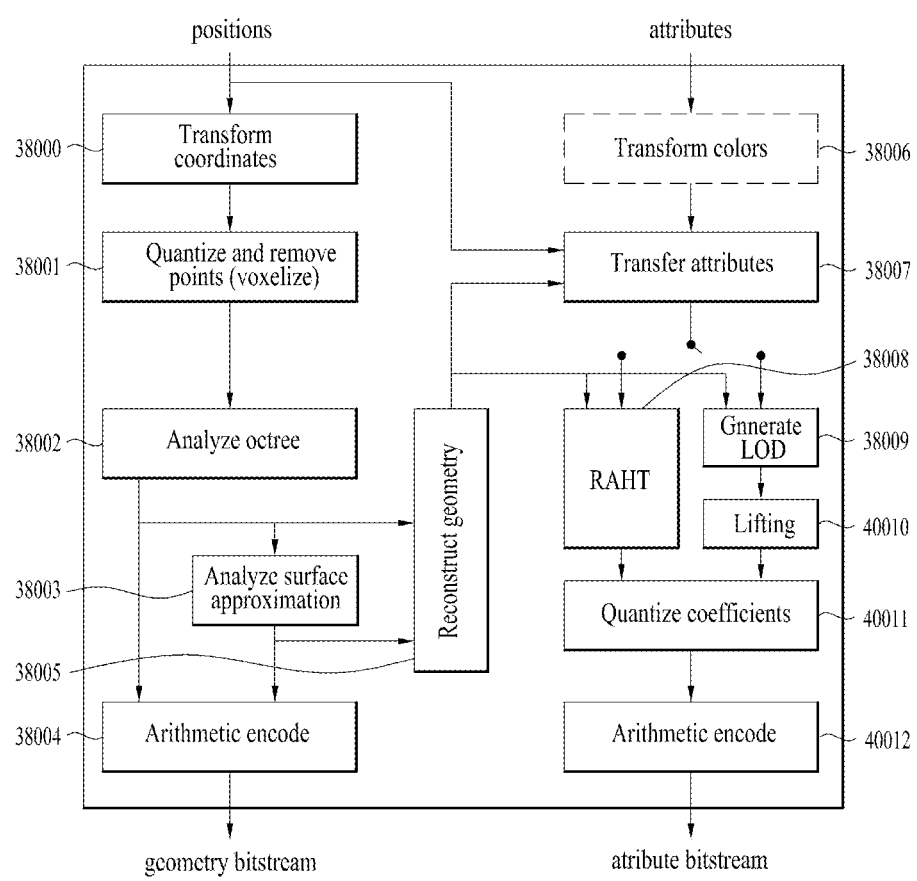
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
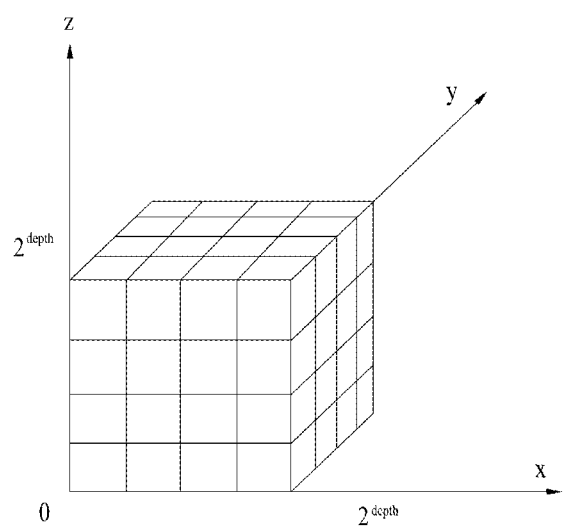
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d=\text{Ceil}(\text{Log }2(\text{Max}(x_n^{int},y_n^{int},z_n^{int},n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix};  \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};  \quad \text{ii)}$$

$$\begin{bmatrix} \sigma_x^2 \\ \sigma_y^2 \\ \sigma_z^2 \end{bmatrix} = \sum_{i=1}^{n}\begin{bmatrix} \overline{x}_i^2 \\ \overline{y}_i^2 \\ \overline{z}_i^2 \end{bmatrix}  \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
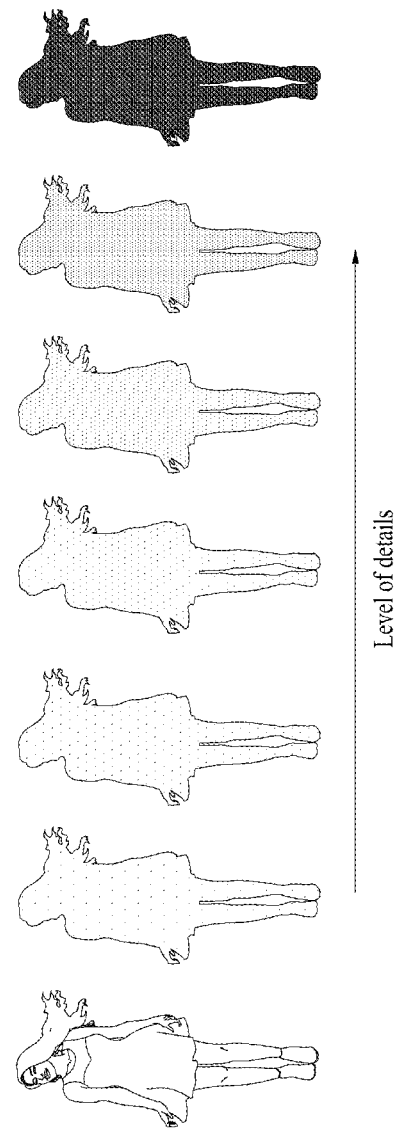
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
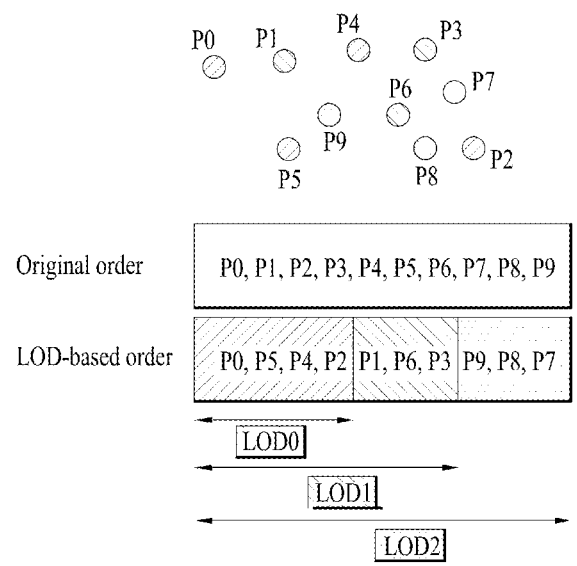
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code
```
int PCCQuantization(int value, int quantStep) {
if( value >=0) {
return floor(value / quantStep + 1.0 / 3.0);
} else {
return -floor(-value / quantStep + 1.0 / 3.0);
}
}
```

-continued

TABLE Attribute prediction residuals inverse quantization pseudo code
```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
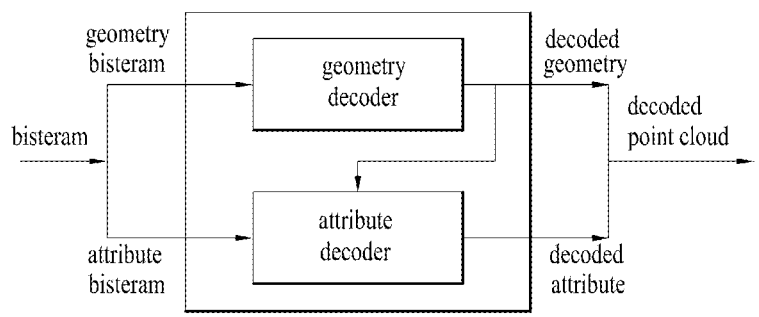
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
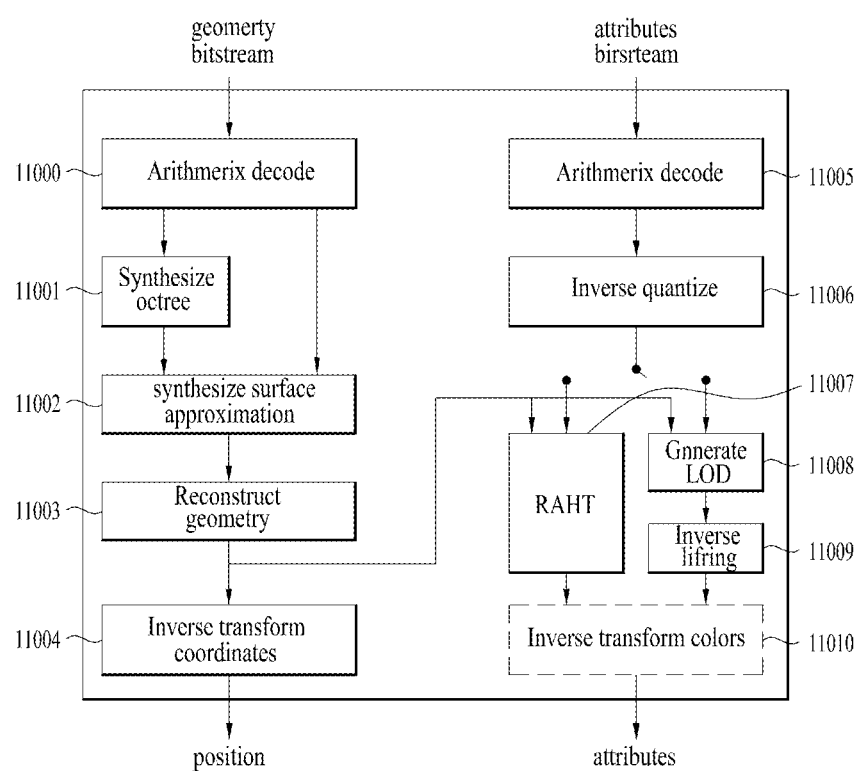
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approxima- tion) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
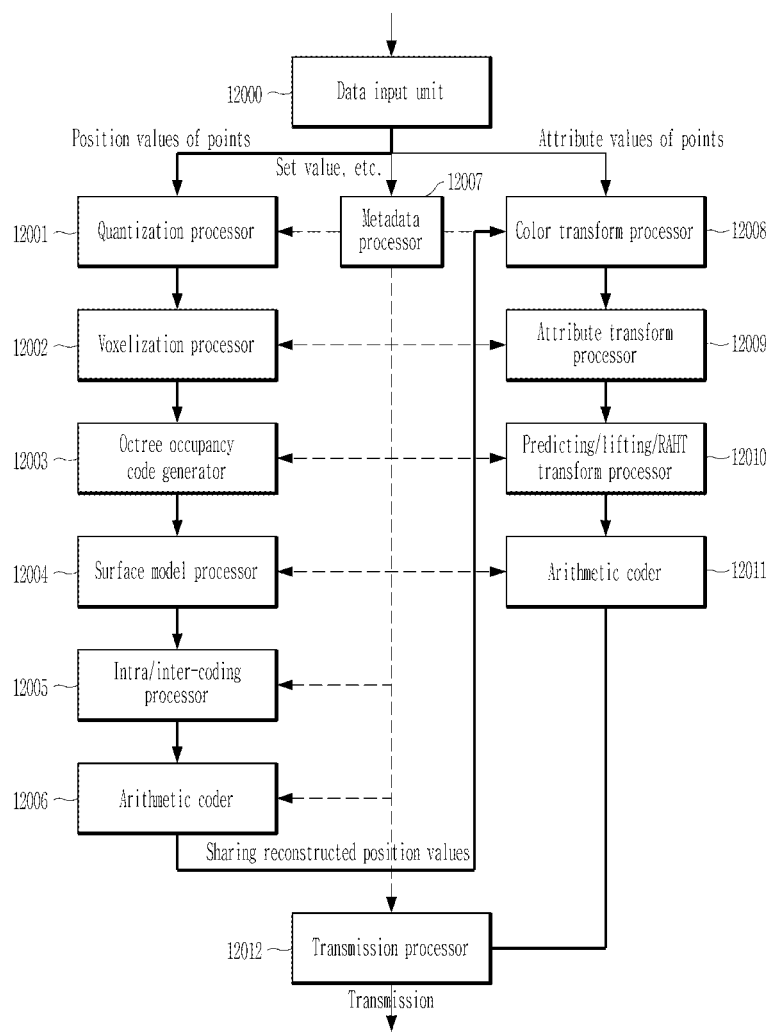
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geomparameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
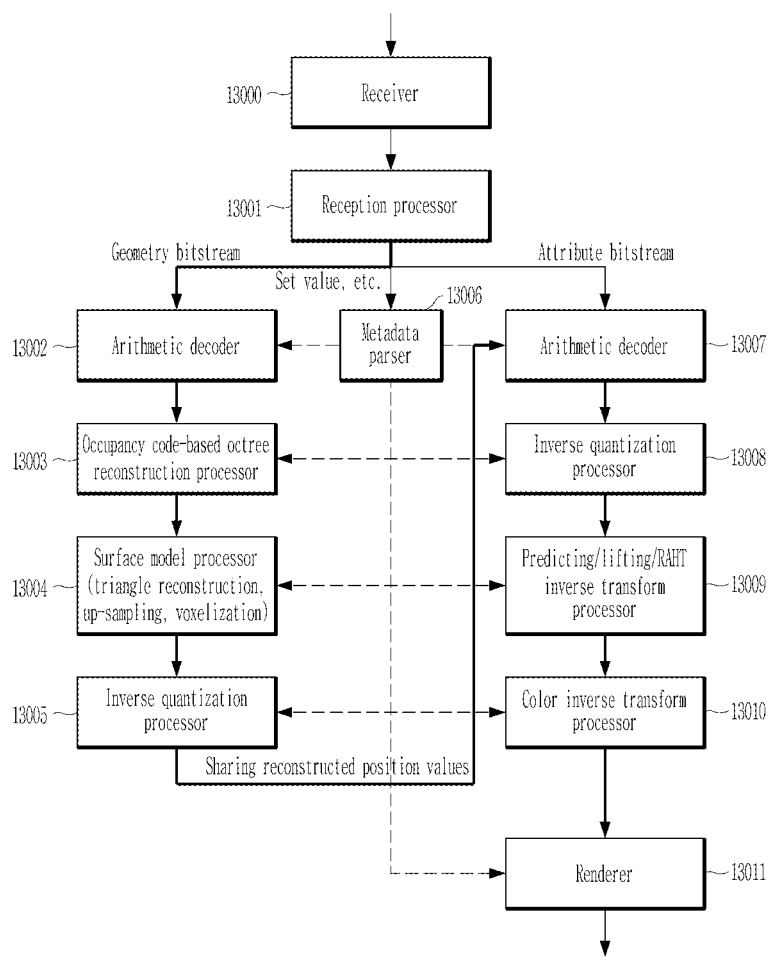
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
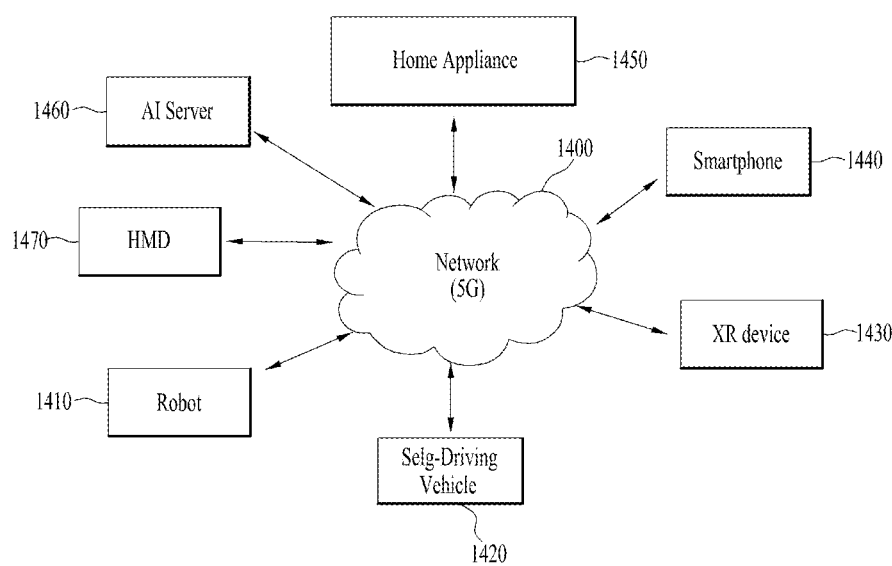
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 19:
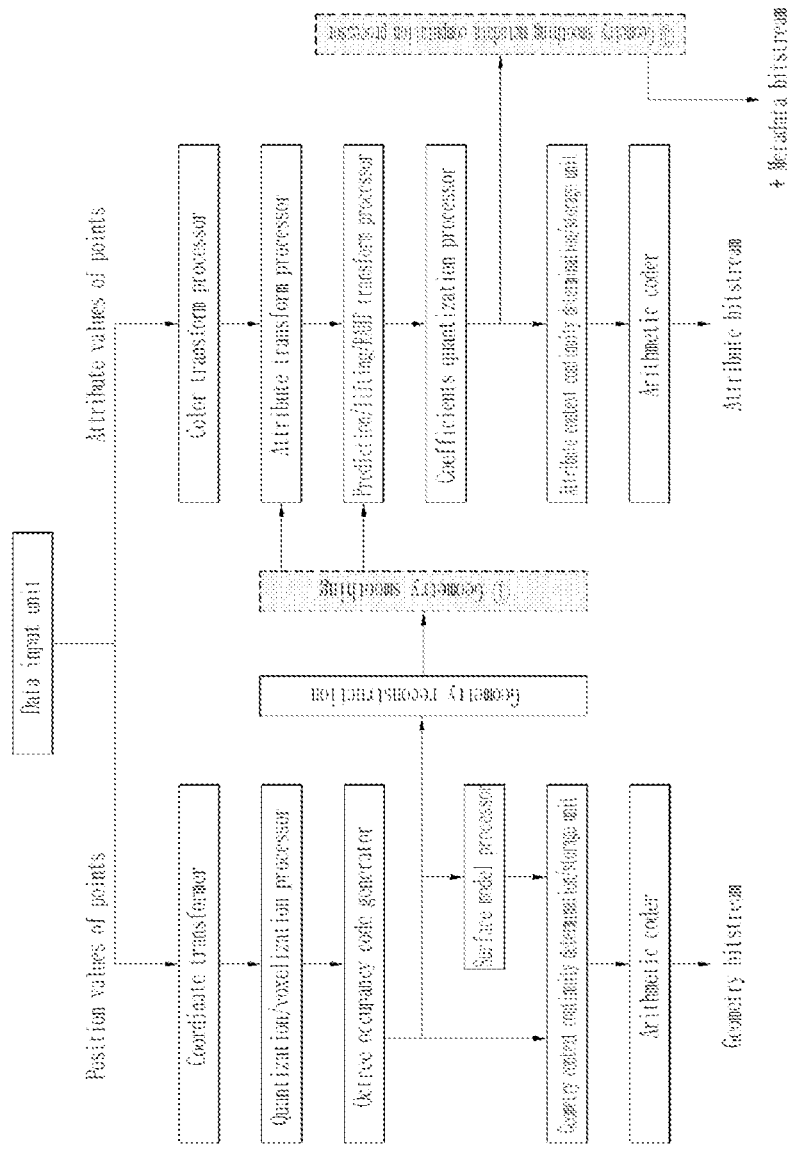
FIG. 19 shows an example of laser angle-based sorting according to embodiments.

A method/device for transmitting point cloud data according to embodiments is construed as a term referring to the transmission device 10000 of FIG. 1, the point cloud video encoder 10002 of FIG. 1, the transmitter 10003 of FIG. 1, and the acquisition 20000/encoding 20001/transmission 20002 of FIG. 2, the encoder of FIG. 4, the transmission device of FIG. 12, the device of FIG. 14, the encoder of FIG. 19, and the like.

Figure 20:
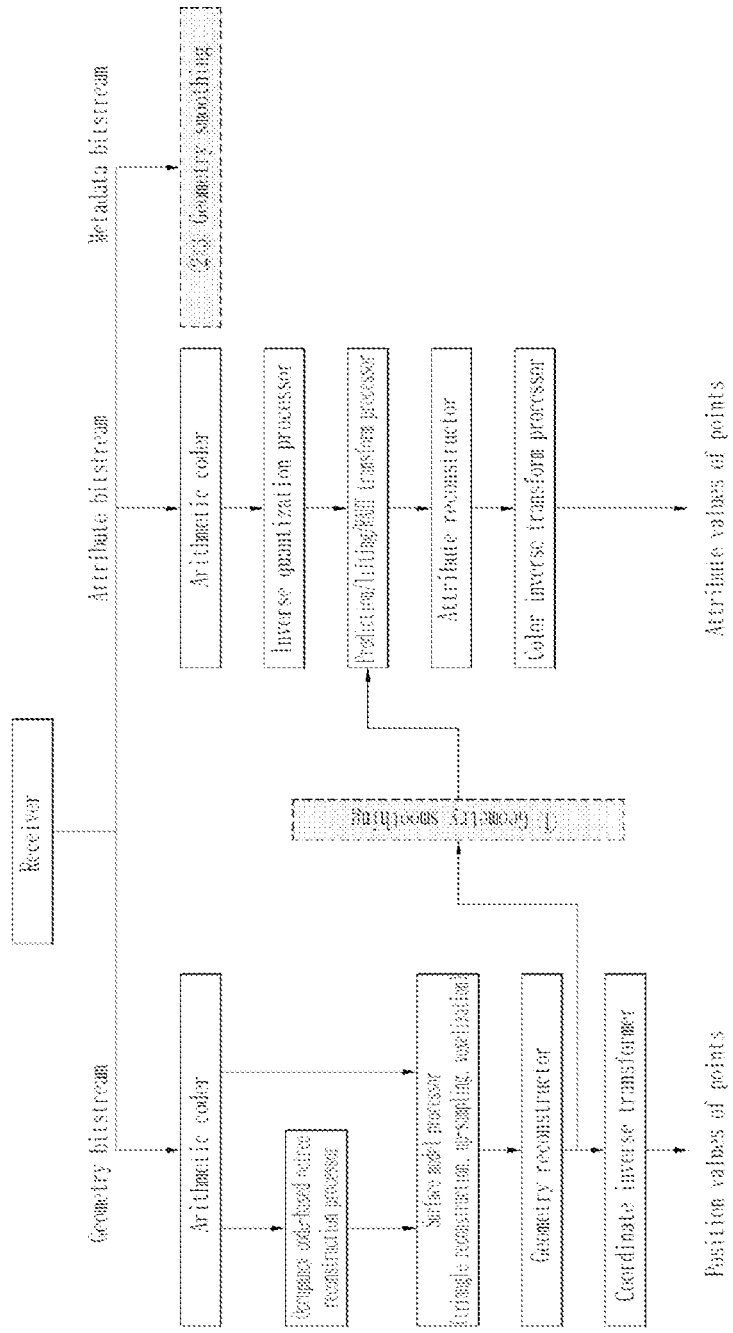
FIG. 20 shows an example of generating a laser group and a predictive tree according to embodiments.

A method/device for receiving point cloud data according to embodiments is construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 20, and the like.

In addition, the method/device for transmitting and receiving point cloud data according to the embodiments may be simply referred to as a method/device according to the embodiments.

According to embodiments, geometry data, geometry information, position information, and the like constituting the point cloud data are construed as having the same meaning. Attribute data, attribute information, attribute information, and the like constituting the point cloud data are construed as having the same meaning.

Methods/devices according to embodiments may include a geometry smoothing method for improving the visual quality of the point cloud compression.

Embodiments are directed to a method of smoothing geometry values for improving the visual quality of point cloud data compression. After encoding/decoding of the point cloud compression, transmission errors, compression errors, etc. may be eliminated and the visual quality of the point cloud compression may be improved. Furthermore, geometry smoothing and/or signaling schemes related thereto according to embodiments may provide the above effects. Compared to recoloring according to V-PCC standard techniques, embodiments propose G-PCC smoothing. Embodiments may accurately process points or overlapping regions that are located at the boundaries between regions, such as tiles/slices, which are encoding/decoding units. Recoloring is a technique for coloring a representative color for a modified position, which differs in purpose and operation from embodiments that adjust the actual position of geometry.

Embodiments propose geometry smoothing for improving the visual quality of geometry that is degraded during compression of three-dimensional point cloud data. Regarding unevenly spaced points in a point cloud, such as at the boundaries of slices, the boundaries of tiles, the boundaries of frames, and the boundaries of roads and objects, embodiments may provide encoding/decoding methods for improving the visual quality and efficiency of geometry compression.

A point cloud is composed of a set of points, and each of the points may have geometry information and attribute information. Encoding the point cloud may include compressing geometry and compressing the attribute information based on the geometry reconstructed with position information changed through compression (reconstructed geometry=decoded geometry). Decoding the point cloud may include receiving an encoded geometry bitstream and attribute bitstream, decoding geometry, and decoding attribute information based on the geometry reconstructed through the decoding operation (See FIGS. 4 and 11).

Before encoding, the point cloud is divided into tiles/slices/bricks/objects, each of which undergoes the encoding process. The partitioning units such as tiles/slices/bricks/objects may be determined by the definition of computing power, memory usage, data size, and space available for processing. In addition, the number of points in the unit of partitioning may vary in order of tiles, slices, bricks, and objects, and may have different bitstream configurations. In this case, geometry smoothing may be applied to tile-to-tile, slice-to-slice, brick-to-brick, and object-to-object boundaries, as well as tile-to-slice, slice-to-brick, and slice-to-object boundaries.

Category 1, 2, and category 3-fused data is data that consists of a single frame but has many points representing terrain features or buildings that represent a large space. Category 3-frame data contains roads and objects in a single frame, but represents a relatively small space. Therefore, category 1, 2 and category 3-fused data have many tile boundaries and slice boundaries, and category 3-frame data have relatively many road to object boundaries. Therefore, during the encoding operation, it is necessary to signal where boundaries exist while performing data partitioning, and the decoder may determine whether geometry smoothing is required after reconstructing the geometry. Thereby, the processing operation for boundaries in point cloud data may be identified.

Although geometry smoothing is not defined in GPCC, VPCC defines geometry smoothing for the decoder and adopts the same in the standard. Due to the nature of point clouds, the data is represented by the presence or absence of points in 3D space, and thus the representation of points in unoccupied space is also important. After decoding a point cloud, unoccupied space may appear in two cases: 1) empty space resulting from unoccupied points in the input point cloud, or 2) empty space on adjacent faces of two spaces with different data quantization. In case 2), an artificial boundary (artifact) of empty space appears in the space with different quantization, and research has been conducted on deblocking filtering to improve image quality and prediction performance at the corners of this boundary. Compared to deblocking filtering for color in 2D, embodiments may provide correction of geometry position values in 3D and deblocking filtering of color values based on the corrected position values.

Figure 15:
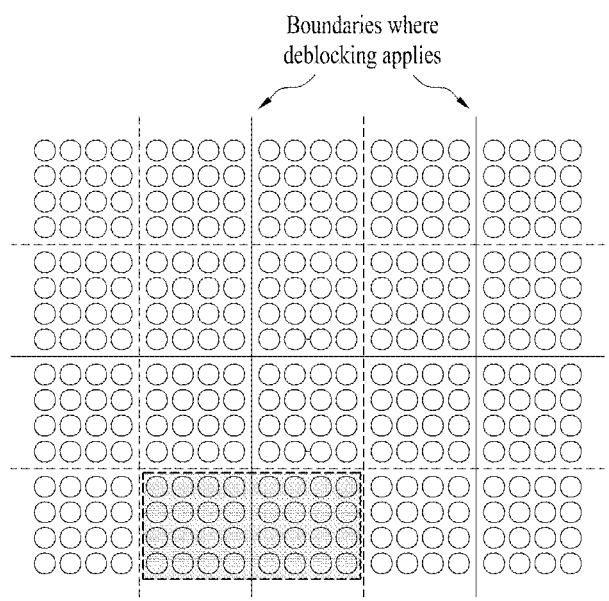
FIG. 15 shows additional attribute data included in point cloud data according to embodiments.

FIG. 15 illustrates a 2D deblocking filter according to embodiments.

FIG. 15 shows an example of how a deblocking filter for use in 2D is defined. Each dot is a color value, the edges that are applied are shown as solid lines, and the edges that are not applied are shown as dashed lines.

Deblocking/smoothing according to the embodiments may have the following differences from VPCC (2D) smoothing. VPCC smoothing uses trilinear filtering to interpolate points on adjacent faces, which results from preserving low-frequency components and removing high-frequency components in a 2D patch. The deblocking/smoothing according to embodiments may linearly interpolate the points because different quantization values on adjacent faces of a slice result in different densities of points. In other words, the cause of the problem is different from the position where operation is performed by the codec. Also, from an overlap perspective, since mapping of VPCC is performed on 2D patches, there is no definition and no signaling of overlap. From a signaling perspective, the VPCC standard (H.20.2.19) specifies gs_method_type (the geometry smoothing method), gs_filter_eom_points_flag (whether to apply to enhanced occupancy information), gs_grid_size_minus2 (the grid size to which geometry smoothing is to be applied), and gs_threshold (smoothing threshold). Embodiments may add a signal that can be processed in an overlap slice, a signal for calculating a smoothing application value from quantized information, a value that should be clipped after smoothing is applied, etc. The smoothing operation and signaling scheme according to embodiments will be described in detail below.

Embodiments provide a geometry smoothing method for improving the image quality of encoded/decoded point cloud data and improving compression efficiency. Embodiments may include a method for geometry correction by the encoder, a method for geometry correction by the decoder, and methods for improving image quality by delivering information about adjacent faces at the data partition level. Embodiments may also include a method for communicating the boundaries of data from the encoder to the decoder to allow the decoder to reduce computational complexity for adjacent faces and smooth artificial boundaries.

Embodiments may include a method for transferring information about adjacent faces to the decoder when the data is partitioned by the encoder, and a geometry smoothing method. While divided data is readily recognized by the encoder during the partitioning process, the decoder receives a bitstream as input on a data unit basis. Therefore, information about adjacent faces is delivered by the encoder by signaling on a per-unit basis (which may reduce computational complexity). The decoder may determine whether or not to apply smoothing to the signaled adjacent faces, which may be performed during data integration on a threshold basis. After geometry decoding, geometry smoothing may be performed, and attribute decoding with smoothing applied may be performed. In this case, the smoothed geometry information is used to decode the attribute information. Additionally, if there is a loss of attribute information, color smoothing may be performed or an edge filter (Laplacian filter, Gaussian filter), a median filter, a Gan filter, or the like may be used for color enhancement filtering. Alternatively, the difference between the geometry information given before the position value is corrected and the corrected geometry information may be delivered as metadata to allow the attribute information to be decoded.

Figure 28:
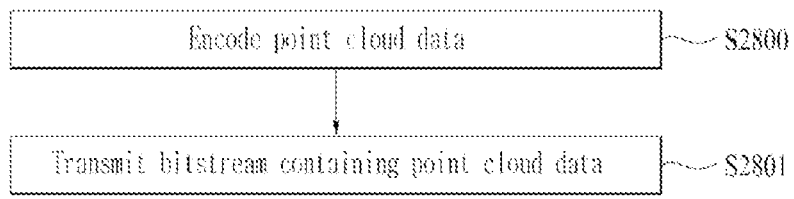
FIG. 28 illustrates a method of transmitting point cloud data according to embodiments.
Figure 29:
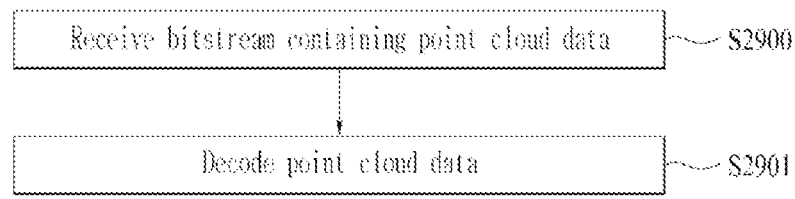
FIG. 29 illustrates a method of receiving point cloud data according to embodiments.

Methods/devices according to embodiments may correspond to the transmission device 10000 and point cloud video encoder 10002 of FIG. 1, the encoding 20001 of FIG. 2, the encoder of FIG. 4, the transmission device of FIG. 12, the XR device 1430 of FIG. 14, the encoder of FIG. 19, the point cloud data transmission method of FIG. 28, the reception device 10004 and point cloud video decoder 10006 of FIG. 1, the decoding 20003 of FIG. 2, the decoder of FIGS. 10 and 11, the reception device of FIG. 13, the XR device 1430 of FIG. 14, the decoder of FIG. 20, and the point cloud data reception method of FIG. 29, and the like, and may include the following processes:

1. Delivering information used in partitioning data
2. Delivering information about adjacent faces of the partitioned data: Information about adjacent faces may be signaled to the decoder.
   1) Presence or absence of an adjacent face per frame/tile/slice/brick/object and the position information about the adjacent face may be signaled.
   2) Whether adjacent faces at the frame/tile/slice/brick/object level overlap may be signaled.
3. Determining whether to perform geometry smoothing and specifying a threshold
4. Specifying where to apply geometry smoothing 5. Decoding attribute information and enhancing attributes after applying geometry smoothing
6. Delivering metadata for attribute information and clipping The method of position value correction using geometry smoothing allows the repositioning of artificial points present in space. With the method, the compression efficiency may be expected through evenly distributed points. For the gaps between points caused by quantization, visual effects may be enhanced by using metadata or neighbor points. Data partitioning methods associated with the range of smoothing that may be performed on the boundaries of multiple units to implement these embodiments include a signaling method and a smoothing method.

1. Delivering Information Used in Partitioning Data

Methods for partitioning point cloud slice data may include, for example, three methods. According to embodiments, the methods include uniform geometry partitioning having two faces on the left and right as adjacent slices, uniform square partitioning having four faces on the left, right, top, and bottom as adjacent slices, and octree geometry partitioning having six faces on the top, bottom, front, back, left and right as adjacent slices. Among the method, the uniform square partitioning having four faces on the left, right, top, and bottom as adjacent slices is adopted as a standard. Depending on how the partitioning is applied by the encoder, slices with 2/4/6 adjacent faces are created. In this case, the encoder may recognize the locations of the slices, neighboring information, and information about overlapping slices. However, if this information is not communicated to the decoder by signaling, the information for smoothing may not be known. Therefore, the data partitioning information used by the decoder may be communicated to the decoder as signaling information, thereby allowing the decoder to recognize locations where geometry smoothing is to be applied. The signaling information according to the embodiments is described in detail with reference to FIGS. 22 to 27.

2. Communicating Information about Adjacent Faces of Partitioned Data:

A method/device according to embodiments may signal adjacent faces of the partitioned data via information used in partitioning the data. The adjacent faces may be communicated from the encoder to the decoder by a predefined index at any of the 2/4/6 faces. slice_partitioing_method may signal a partitioning method. Also, depending on the partitioning method (UniformGeom: 2 bits, UniformSquare: 4 bits, OctreeUniform: 6 bits), bits may be allocated to the smoothing slice edges (smoothing_slices_edges[slice_partitioning_method]) and represented as (UniformGeom: 0-1-2 bit array, UniformSquare: 0-3-4 bit array, OctreeUniform: 0-5-6 bit array). In the smoothing_slices_edges[slice_partitioning_method] array, a flag indicating the presence or absence of slices based on the current slice may be signaled to the decoder.

Figure 16:
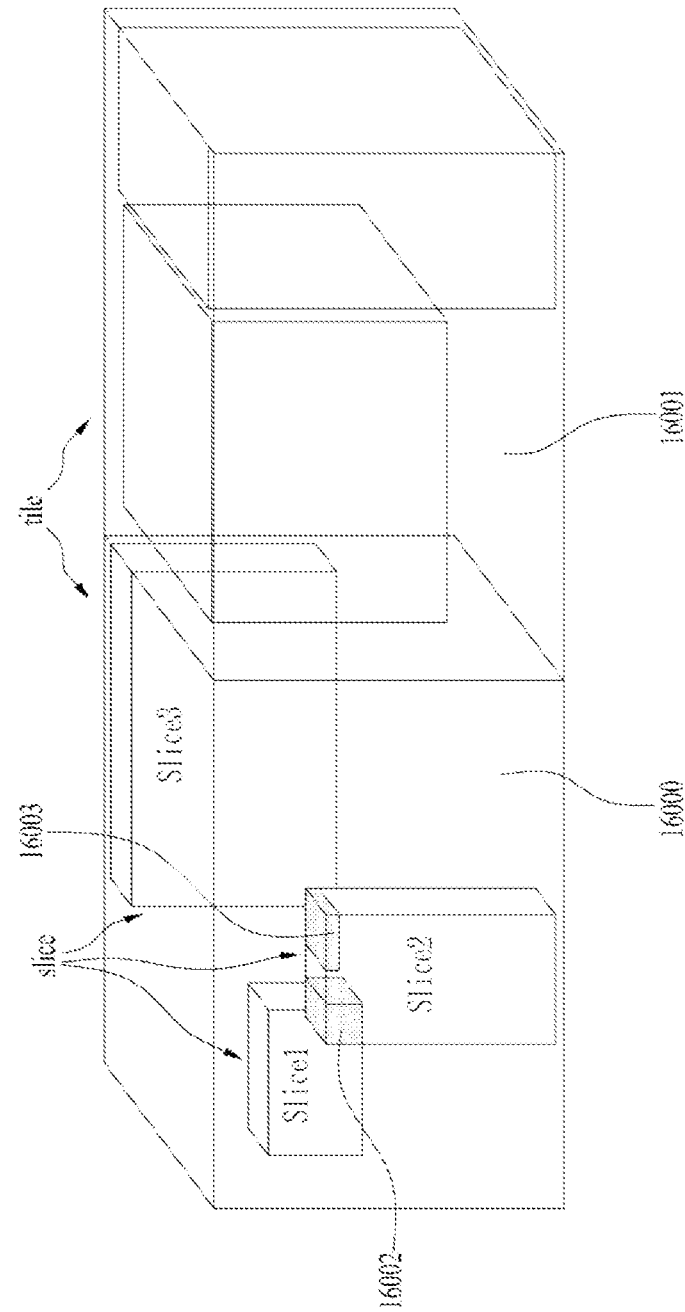
FIG. 16 shows an example of an origin position for point cloud data according to embodiments.

FIG. 16 shows an example of an origin position for point cloud data according to embodiments.

1) Signaling presence or absence of an adjacent face per frame/tile/slice/brick/object and the position information about the adjacent face:

A unit of data definition for a point cloud may be defined as a frame, tile, slice, brick, object, or the like. The methods/devices according to embodiments may indicate and communicate as signaling information whether an adjacent face is present in the defined unit. The methods/devices according to embodiments may transmit and receive signaling information indicating adjacent boundary surfaces/edges/points between defined units after partitioning. For example, in order to signal adjacent face information in tiles and slices, it is necessary to communicate all of the following: 1. signaling of an adjacent face between tiles, 2. signaling of a slice and an adjacent face within a tile, and 3. signaling of an adjacent face between slices. FIG. 16 illustrates the adjacency information about tiles and slices.

A first tile 16000 and a second tile 16001 may be adjacent to each other. There may be multiple slices within the first tile. After partitioning, overlapping adjacent faces/adjacent region 16002 may occur between slice 1 and slice 2, and an overlapping adjacent face/adjacent region 16003 may occur between slice 2 and slice 3.

The signaling information according to the embodiments may include smoothing_slices_use_flag, slice_partitioning_method, overlapping_region_exist_flag, smoothing_cancelation_flag, quantized_distance_xyz, geometry_smoothing_metadata_exit_flag, metadata_data_unit, smoothing_clip_flag, smoothing_tiles_use_flag: tile_partitioning_method, smoothing_use_flag, and smoothing_unit_def.

For example, given two slices, there are six possible adjacent faces (on the left, right, front, back, top, and bottom), and the positions of the adjacent faces may be represented by signaling information. For the six faces, the left, right, front, back, top, and bottom positions may be specified based on a range of 0-5.

1) The adjacent face information between tiles according to embodiments may include information on the overlap, the offset of the tiles, and the width/height/depth of the region.

For example, in FIG. 16, the first tile 16000 and the second tile 169001 do not overlap each other. Accordingly, signaling information of only 1 for the right among left=0, right=1, top=2, bottom=3, front=4, and back=5 may be generated as the position of the adjacent face and transmitted, and a flag indicating whether smoothing is to be performed may be transmitted.

2) To signal slices and adjacent faces within a tile, a flag indicating tile adjacency may be signaled in the slice adjacency information and the region adjacent to the right tile may be smoothed because slice 3 and the right tile are adjacent.

In smoothing_slices_edges[slice_partitioning_method], when smoothing_slices_edges[1]=true, the decoder signals a region that is geometry-smoothed with the decoded points of the right tile.

3) Signaling of adjacent faces between slices may convey the adjacent region 16002 of slice 1 and slice 2. The offset and whd (width/height/depth) information about slice 1 and the offset and whd information about slice 2 may be used to indicate the overlapping region, the cube 16002. This region is the overlapping portion between the two slices, and the offset and whd information about this region may be re-signed. Similarly, the region 16003 may be signaled as information overlapping with the information about slice 2. The overlapping information may be included in at least one or both of the bitstreams of the overlapping data units.

2) Signaling whether adjacent faces at the frame/tile/slice/brick/object level overlap:

When information about whether there are adjacent faces of a defined unit according to embodiments and where the adjacent faces are located is signaled, the encoder may determine whether they are overlapping. The encoder may calculate offset information and/or bounding box information and transmit a flag corresponding to information indicating the overlapping in the signaling information. Alternatively, the decoder may perform a calculation based on the offset and bounding box received through the signaling information to determine the overlapping. The information about the overlapping portion may be used to assign a higher weight to the smoothing of the boundary, in the following order: a case of overlapping points, a case of overlapping planes, and a case of overlapping cubes.

Whether adjacent faces according to embodiments overlap may be signaled by the overlapping_region_exist_flag.

Figure 21:
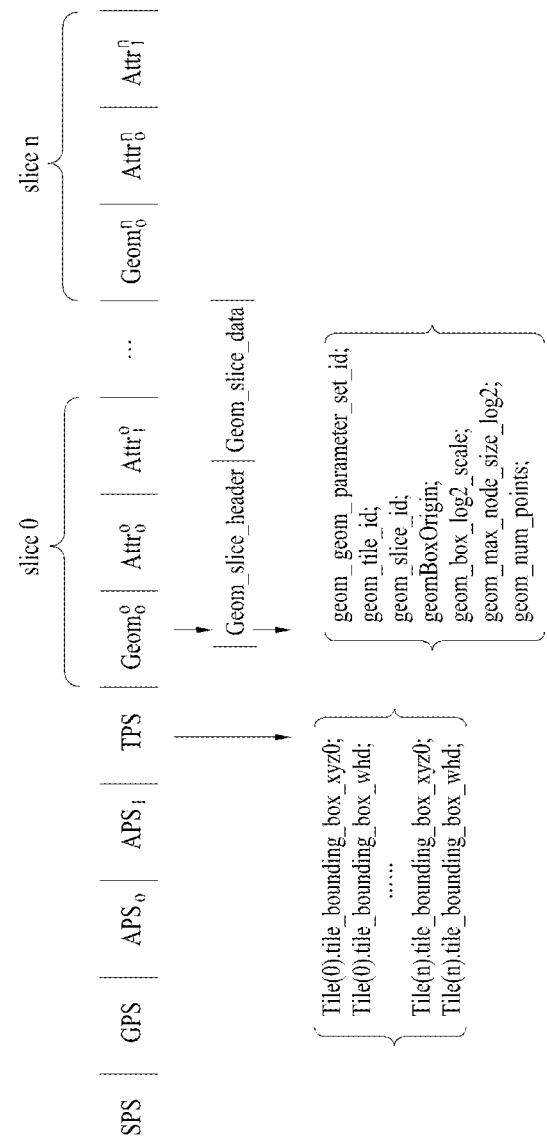
FIG. 21 illustrates a point cloud data transmission device according to embodiments.

The offset information and/or bounding box information according to embodiments may be included and carried in the sequence parameter set and/or slice parameter set in the bitstream of FIG. 21.

FIG. 17 illustrates a method of determining whether to perform geometry smoothing and a method of specifying a threshold according to embodiments.

3. Determining Whether to Perform Geometry Smoothing and Specifying a Threshold

The geometry smoothing method may utilize a distance vector of a point/plane/cube, a mean value of points, a median value of corresponding points, etc. In addition, a point group may be selected. As the point group, a set of close points in a KD-tree (a data structure that spatially partitions points in space), a set of points below a morton code threshold, a set of points within a certain distance, or the like may be selected. The centroid c of the set of points p selected from points/plane/cube may be calculated as indicated by 17000.

The equation for finding the normal of the centroid c by inner product may be used to determine whether two adjacent faces are smooth. The normal of the centroid may be found by inner product as indicated by 17001.

The set of points to smooth may be identified by the normal of the centroid for a set of points obtained by inner product. For example, a normal vector to the plane of three or more points may be calculated, and the points may be repositioned in the direction of this normal vector.

The smoothing method to be applied to the set of points may include a method based on a plane distance. The equation for changing the position of a point to an intermediate position between c and c' for the distance of the plane corresponding to the boundary is indicated by 17002.

Here, the calculation is performed based on the quantized density of c and the quantized density of c', where the respective densities are defined as q and q'. The smoothing coefficients to be applied to each set of points are s and s'.

Then, a threshold is set, such that the difference between the quantized densities of q and q' is small, or such that the attribute coding efficiency is lowered when s and s' are applied. However, geometry smoothing may not be performed by determining the degree to which a set of points is sparsely populated on a boundary surface based on the threshold.

Figure 18:
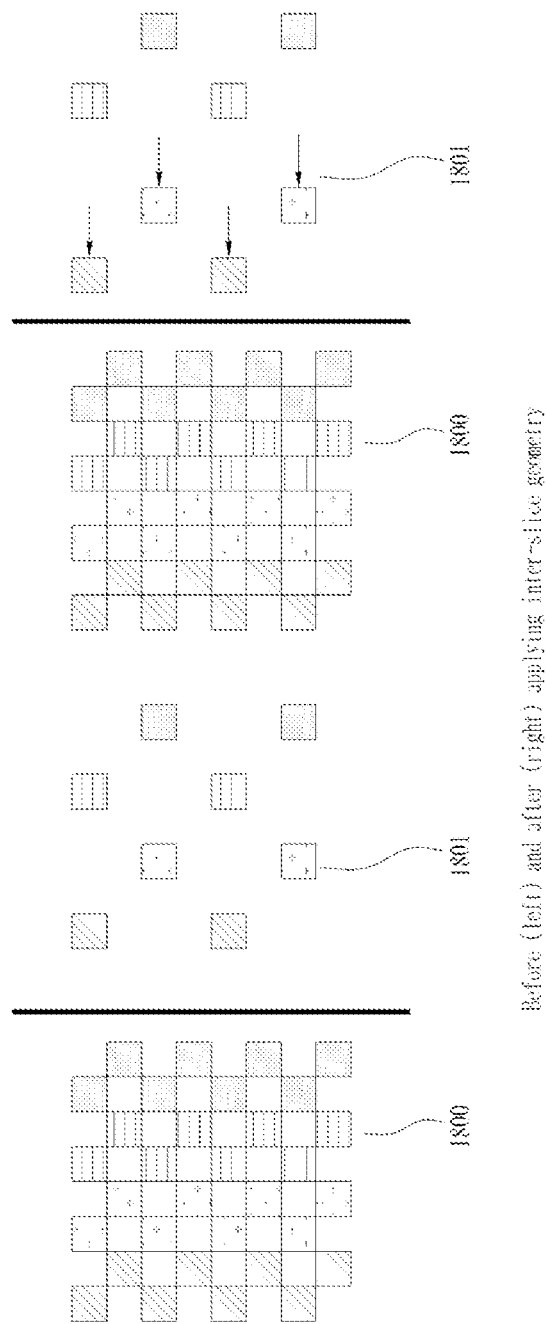
FIG. 18 shows an example of setting an origin position when there is no laser angle given according to embodiments.

FIG. 18 illustrates an example of applying inter-slice geometry smoothing according to embodiments.

A method/device according to embodiments may specify where to apply geometry smoothing as follows.

4. Specifying where to Apply Geometry Smoothing

Geometry smoothing may specify a smoothing intensity on an adjacent boundary surface. The degree of smoothing can be referred to as the degree of compensation, and is used when the amount of change between two adjacent faces is large. In FIG. 17, when the difference between c and c' is greater than a threshold, the amount of change is determined to be large, and the smoothing degree may be applied linearly from the inside of the boundary surface where smoothing should be performed.

Referring to FIG. 18, when a first slice 1800 and a second slice 1801 are adjacent, smoothing may be applied to geometry data (points) 1802 on the boundary surface.

When the difference between the centroid c for the points in the first slice and the centroid c' for the points in the second slice is greater than a threshold, the amount of change of the points on the boundary surface is large, and thus smoothing may be applied linearly. After the smoothing 1802 is applied, the geometry data becomes less variable and more linearly distributed on the boundary surface.

The equation for performing geometry smoothing may follow the equations in FIG. 17, or any equation that uses an average of the position values of the geometry may be applied.

5. Decoding Attribute Information and Enhancing Attributes after Applying Geometry Smoothing Methods/devices according to embodiments may improve the performance of attribute coding by performing geometry smoothing and encoding attribute data.

The method of applying geometry smoothing may be applied by the encoder/decoder in various ways as follows.

Example flowchart 1 according to embodiments: (encoder) Encode geometry→<u>Apply geometry smoothing</u>→Encode attributes/(decoder) Decode geometry→<u>Apply geometry smoothing</u>→Decode attributes Example flowchart 2 according to embodiments: (Encoder) Encode geometry→Encode attributes/(Decoder) Decode geometry→Decode attributes→<u>Apply geometry smoothing</u>

Example flowchart 3 according to embodiments: (Encoder) Encode geometry→Encode attributes→<u>Compute geometry smoothing metadata</u>/(Decoder) Decode geometry→Decode attributes→<u>Apply geometry smoothing metadata</u>

In method 1 of applying geometry smoothing, geometry smoothing may be applied to the geometry reconstructed by performing geometry encoding, and attribute encoding may be performed based on the geometry processed through geometry smoothing. In this case, the attribute encoding is performed in units of application, and the decoder also performs attribute encoding based on the smoothed geometry. In method 1, the same smoothing process is performed by the encoder and decoder. However, the decoder cannot determine the smoothing process and may not have the option to not use smoothing. In method 2, smoothing may be performed by the encoder, and may be used as a post-processing after the geometry and attribute decoding process is completed by the decoder operation. In this case, the decoder may perform post-processing that only signals whether geometry smoothing is applied and information about an adjacent region of a smoothing unit. This does not affect the compression efficiency of the encoding/decoding, but may improve the subjective image quality of the point cloud by smoothing filtering. In method 3, after encoding the geometry and attributes, the geometry values—the geometry values obtained by applying smoothing—may be delivered to the decoder as geometry smoothing metadata. Although the metadata is additionally sent, higher compression efficiency may be achieved when the constant spacing resulting from geometry smoothing converges to the entropy distribution. The metadata in this case may be used by the decoder only for geometry decoding or for attribute decoding based on geometry smoothing. The difference between the geometry delivered by the metadata and the geometry-smoothed values may allow the decoder to determine whether to use the metadata. In some embodiments, whether to use the metadata may be determined based on a smoothing flag.

To signal to the encoder whether smoothing is applied, the smoothing flag may be delivered. Additionally/alternatively, in the absence of the smoothing flag, the metadata may be delivered to signal that geometry smoothing is applicable.

FIG. 19 illustrates a point cloud data transmission device according to embodiments.

The point cloud data transmission method/device according to the embodiments refers to the transmission device 10000, point cloud video encoder 10002, and transmitter 10003 of FIG. 1, the acquisition 20000-encoding 20001-transmission 20002 of FIG. 2, the encoder of FIG. 4, the transmission device of FIG. 12, the device of FIG. 14, the encoder of FIG. 19, and the like. Each component of the transmission device may correspond to hardware, software, a processor, and/or a combination thereof.

The data input unit may receive point cloud data. The geometry data (positions of points) contained in the point cloud data may be encoded by a geometry encoder, and the attribute data (attributes of the points) contained in the point cloud data may be encoded by an attribute encoder.

The coordinate transformer may transform the coordinate system for the positions of the points, which are geometry data, into a coordinate system suitable for encoding.

The quantization/voxelization processor may quantize and voxelize the point cloud data based on quantization parameters. Quantization and/or voxelization may be applied to efficiently compress points distributed in space.

The octree occupancy code generator may present the geometry data in a hierarchical structure based on an octree and generate an occupancy code indicating whether the geometry data is occupied.

The surface model processor may perform trisoup geometry encoding, which is a voxel-by-voxel reconstruction of the positions of points in a specific region (or node) based on a surface model. According to embodiments, the surface model may generate a triangle soup with one to ten triangles per block.

The arithmetic coder may encode the geometry data using an arithmetic encoding scheme. The geometry encoder may generate a geometry bitstream containing the position information about the encoded points.

The geometry reconstructor may reconstruct the encoded points and provide the reconstructed geometry data to the attribute encoder.

The geometry smoother may perform smoothing based on the geometry information. Information required for smoothing may include quantization coefficients, degree of scaling, smoothing adjacency information, and whether to perform clipping. According to embodiments, the information may be indicated by flags or values.

The geometry smoother may perform the flowchart of Example 1 (Method 1) above.

The attribute encoder may encode the attribute data of the point cloud data based on the reconstructed geometry data.

The color transform processor may transform the color of the attribute data. The color may be transformed to a color suitable for encoding.

The attribute transform processor may transform the attributes. It may sort the points, and perform a neighbor search and the like to compress the attribute information about the points.

The prediction/lifting/RAHT transform processor may encode the attribute data. The transformation methods according to embodiments may include a prediction-based method, a lifting-based method, and a RAHT-based method.

The coefficient quantization processor may quantize the attribute data. The coefficient quantization processor may quantize coefficients related to the attribute data.

The arithmetic coder may encode the attribute data based on an arithmetic scheme.

The attribute encoder may generate an attribute bitstream by compressing the attributes of points.

The geometry smoothing metadata computation processor may generate metadata necessary for encoding/decoding based on the attribute values (attribute data) from the input geometry information and the smoothed geometry values. The metadata according to the embodiments may include difference values, thresholds, and equations.

The geometry smoothing metadata computation processor may perform the flowchart of Example 3 (Method 3) above.

FIG. 20 illustrates a point cloud data reception device according to embodiments.

The point cloud data reception method/device according to the embodiments refers to the reception device 10004, receiver 10005, and point cloud video decoder 10006 of FIG. 1, the transmission 20002-decoding 20003-rendering 20004 of FIG. 2, the decoder of FIGS. 10 and 11, the reception device of FIG. 13, the device of FIG. 14, the decoder of FIG. 20, and the like. Each component of the reception device may correspond to hardware, software, a processor, and/or a combination thereof.

Each component of the reception device according to the embodiments may perform an inverse process of a corresponding component of the transmission device.

The reconstruction process of the predictive tree reconstructor according to the embodiments may correspond to the inverse process of geometry smoothing.

The receiver may receive a bitstream containing point cloud data from the transmission device. Geometry data of the point cloud data contained in the bitstream may be decoded by a geometry decoder, and attribute data of the point cloud data contained in the bitstream may be decoded by an attribute decoder.

The arithmetic decoder may decode the geometry data based on an arithmetic scheme.

The occupancy code-based octree reconstruction processor may reconstruct an octree based on the occupancy code.

The surface model processor may reconstruct the geometry data by reconstructing the surface in a triangular shape or by up-sampling or voxelizing the geometry data.

The geometry reconstructor may reconstruct the geometry data and provide the same to the attribute decoder for attribute decoding.

When the coordinates of the geometry data have been transformed in transmission, the coordinate inverse transformer may inversely transform the coordinates.

The geometry smoother may perform smoothing based on the geometry information. Information necessary for smoothing may include quantization coefficients, degree of scaling, smoothing adjacency information, and whether to perform clipping. According to embodiments, the information may be indicated by flags or values.

The geometry smoother may perform the flowchart of Example 1 (Method 1) above.

The arithmetic decoder may decode the attribute data based on an arithmetic scheme.

The inverse quantization processor may inversely quantize the attribute data based on the quantization parameters in a reverse process of the quantization transformation.

The prediction/lifting/RAHT transform processor may decode attribute data based on predictive coding, lifting coding, RAHT, or the like.

The attribute data may be reconstructed by the attribute reconstructor. It may be reconstructed by the predictive tree reconstructor, which may correspond to the reverse process of geometry smoothing.

The color inverse transform processor may inversely transform colors if they have been transformed.

In the case of smoothing examples 2 and 3 (methods 2 and 3), a metadata bitstream containing information related to geometry smoothing may be received by the receiver, and the geometry smoothing may be applied in the attribute decoding.

6. Delivering Metadata for Attribute Information and Clipping

To address the reduced compression efficiency of attribute information, loss of attribute information, and subjective degradation of image quality due to the application of geometry smoothing, the method/device according to the embodiments may deliver as metadata the difference between the un-smoothed geometry and the smoothed value. The metadata allows the decoder to determine whether smoothing is used. Also, depending on the compression efficiency, a stream with a smaller amount of information (better attribute compression) determined by comparing the bitstream length of the metadata with the length of the entropy stream of the attribute values with the metadata applied. Even when the amount of information in the metadata is large, the metadata may be transmitted as signaling information because the reconstructed point cloud is less distorted.

In addition, the decoder to which the metadata is applied may clip the geometry such that the geometry exists within a geometry region. It may clip the metadata-applied attribute information. The clipping region may be defined by the offset of the region of the data unit in the geometry and the width/height/depth (whd) of the bounding box. The smoothing clipping of the attribute information may be defined by the depth of the attribute information or the min/max of the attribute value.

In the clipping according to the embodiments, the encoder/decoder may perform a lossy prediction. In this case, a value obtained through the operation is greater than or equal to the data precision value or less than or equal to 0, it may be changed to a value (between min: 0 and max: 2^precision-1).

The clipping according to the embodiments may be performed in combination with example flowchart 1, example flowchart 2, or example flowchart 3 according to the embodiments.

The offset of the geometry, the whd information, the precision depth of the attribute, and the min/max signaling information about the attribute value may be included in a bitstream according to embodiments as information about the region. In addition, clipping, offset, and whd information about a region changed due to the clipping may be added to the bitstream.

The following signaling information is required to apply geometry smoothing according to embodiments.

Whether geometry smoothing is performed (smoothing_slices_use_flag) is signaled.

Information indicating use of partitioning of uniform geometry with 2 adjacent slices on the left and right, partitioning of uniform square with 4 adjacent slices on the left, right, top, and bottom, or partitioning of octree geometry with 6 adjacent slices on the top, bottom, front, back, left and right is signaled by slice_partitioning_method. In this case, bits according to (UniformGeom: 0-1, UniformSquare: 0-3, OctreeUniform: 0-5) are assigned to slice_partitioning_method ue(v).

It is also signaled in each slice_partitioning_method whether overlapping of adjacent information occurs (overlapping_region_exist_flag).

In the case where the encoder has signaled that smoothing should be performed, but the decoder does not perform smoothing per applied unit, smoothing_cancelation_flag may be signaled. If the attribute encoding efficiency is low or there is no metadata, smoothing_cancelation_flag=false is applied.

Information about the degree of quantization or applied octree quantization per applied unit (quantized_distance_xyz) may be signaled. The value of the smoothing applied geometry may be calculated based on the quantized_distance_xyz information.

geometry_smoothing_metadata_exit_flag may be signaled. When geomtry_smoothing_metadata_exit_flag=true, metadata_data_unit( ) may be defined and received in a bitstream.

Clipping of smoothed geometry or attribute information may be performed (smoothing_clip_flag). The offset of the geometry, the width/height/depth (whd) information, the precision depth of the attribute, and the min/max of the attribute value are carried in the signaling information.

The unit of smoothing to be applied may be applied depending on the signaled position, and the applied information is transmitted in a bitstream.

FIG. 21 illustrates a bitstream containing point cloud data according to embodiments.

The transmission method/device according to the embodiments may encode point cloud data, generate related metadata (signaling information), and transmit a bitstream. The reception method/device according to the embodiments may receive the bitstream and decode the point cloud data based on the metadata.

To implement the embodiments, related information may be signaled. The signaling information according to the embodiments may be used at a transmitting side or a receiving side. The signaling information may be generated and transmitted by the transmission/reception device according to the embodiments, for example, the metadata processor (which may be referred to as a metadata generator, or the like) of the transmission device, and received and acquired by the metadata parser of the reception device. Each operation of the reception device according to the embodiments may be performed based on the signaling information.

An encoded point cloud is configured as shown in FIG. 21.

The bitstream contains a set of parameters and contains slices, which are encoding/decoding units. There is geometry data and attribute data per slice. The geometry/attribute data may contain a header and data. The header may contain additional information for the data.

Each abbreviation has the following meaning. Each abbreviation may be referred to by another term within the scope of the equivalent meaning. SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute blick header+attribute brick data; metadata_data_unit( )=geom metadata set.

Slices are provided such that the point cloud may be divided into regions and processed.

When the point cloud is divided into regions, each region may have a different importance.

By providing regions such that different filters and different filter units may be applied according to the importance, a filtering method having high complexity but good result quality may be used in an important region.

By applying different filtering to the respective regions (regions partitioned into tiles or slices) according to the receiver capacity, rather than applying a complex filtering method to the entire point cloud data. Therefore, better image quality may be ensured in a region important to the user and an appropriate latency may be ensured in the system.

Accordingly, when a point cloud is partitioned into tiles, different filters or different filter units may be applied to the respective tiles.

When the point cloud is divided into slices, different filters or different filter units may be applied to the respective slices.

Geometry and attribute smoothing may be signaled and carried in respective bitstreams.

FIG. 22 shows a sequence parameter set according to embodiments

FIG. 22 shows the sequence parameter set included in FIG. 21.

According to embodiments, the smoothing structure information is specified below. The smoothing structure information may be added to the SPS and signaled. Additionally, the smoothing structure information may be contained in the geometry data unit header.

smoothing_slices_use_flag: indicates whether geometry smoothing is performed.

slice_partitioning_method: signals information indicating use of partitioning of uniform geometry with 2 adjacent slices on the left and right, partitioning of uniform square with 4 adjacent slices on the left, right, top, and bottom, or partitioning of octree geometry with 6 adjacent slices on the top, bottom, front, back, left and right. Bits according to (UniformGeom: 0-1, UniformSquare: 0-3, OctreeUniform: 0-5) are assigned to slice_partitioning_method ue(v).

overlapping_region_exist_flag: signals whether overlapping of adjacent information occurs in in each slice_partitioning_method.

smoothing_cancelation_flag: may signal a case where the encoder has signaled that smoothing should be performed, but the decoder does not perform smoothing per applied unit. (true=smoothing is not applied, false=smoothing is applied)

quantized_distance_xyz: may signal information about the degree of quantization or applied octree quantization per applied unit. The value of the smoothing applied geometry may be calculated based on the quantized_distance_xyz information. ([0]-x quantization interval, [1]-y quantization interval, [2]-z quantization interval). The quantization interval may refer to a quantization coefficient (quantization parameter). The quantization coefficient means the accuracy of encoding of the precision according to the bpip rate, and quantized_distance_xyz may be signaled in three arrays of [0]-[2].

geometry_smoothing_metadata_exit_flag: may signal the presence or absence of metadata for attribute information. When geomtry_smoothing_metadata_exit_flag=true, metadata_data_unit( ) may be defined and received in a bitstream.

metadata_data_unit: metadata_data_unit exists when geometry_smoothing_metadata_exit_flag=true. metadata_data_unit may be present in each parameter set, or may be present as a standalone data unit. The metadata unit is metadata indicating "geometry value after geometry and attribute encoding"-"geometry value after smoothing" according to example 3 according to embodiments. Due to the difference between the geometry delivered as metadata and the geometry smoothed value, the decoder may determine whether to use the metadata, and may determine whether to use it as a smoothing flag.

Embodiments may provide explicit signaling with a smoothing flag, or may not have a smoothing flag. Even when no smoothing flag is defined or the smoothing flag is set to false, the decoder may apply smoothing when the metadata according to embodiments is delivered.

The set of residuals of the geometry is entropy-encoded with a specific probability distribution (context). Encoding performed by recalculating the residuals-smoothed geometry values results in a probability distribution of the feature points extracted values, which increases the compression efficiency from an entropy-encoding perspective. This is simply because one more feature point is provided.

smoothing_clip_flag: Indicates whether clipping is performed on smoothing-applied geometry or attribute information. The offset of the geometry, the width/height/depth (whd) information, the precision depth of the attribute, and the min/max of the attribute value are carried in the signaling information.

FIG. 23 shows a tile parameter set according to embodiments.

FIG. 23 is included in the bitstream of FIG. 21. Smoothing structure information may be included in the TPS according to embodiments. For corresponding smoothing structure information between FIGS. 22 and 23, refer to the description of FIG. 22.

smoothing_tiles_use_flag: Signals whether smoothing is performed between tiles.

tile_partitioning_method: Signals the existence of tiles that are adjacent on two faces on the left and right, four faces on the left, right, top, and bottom, and six faces on the top, bottom, front, back, left, and right. (left and right: 0-1, left, right, top, and bottom: 0-3, top, bottom, front, back, left, and right: 0-5) bits are assigned to tile_partitioning_method ue(v).

overlapping_region_exist_flag: signals whether overlapping of adjacent information occurs in each tile_partitioning_method.

smoothing_cancelation_flag: may signal a case where the encoder has signaled that smoothing should be performed, but the decoder does not perform smoothing per applied unit. (true=smoothing is not applied, false=smoothing is applied)

quantized_distance_xyz: may signal information about the degree of quantization or applied octree quantization per applied unit. The value of the smoothing applied geometry may be calculated based on the quantized_distance_xyz information. ([0]-x quantization interval, [1]-y quantization interval, [2]-z quantization interval).

geometry_smoothing_metadata_exit_flag: may signal the presence or absence of metadata for attribute information. When geomtry_smoothing_metadata_exit_flag=true, metadata_data_unit( ) may be defined and received in a bitstream.

metadata_data_unit: metadata_data_unit exists when geometry_smoothing_metadata_exit_flag=true. metadata_data_unit may be present in each parameter set, or may be present as a standalone data unit.

smoothing_clip_flag: Clipping of smoothing-applied geometry or attribute information may be performed. The offset and whd information about the geometry, the precision depth of the attribute, and the min/max signaling information about the attribute value are delivered.

FIG. 24 shows a sequence parameter set according to embodiments.

FIG. 24 is included in the bitstream of FIG. 21. Smoothing structure information according to embodiments may be included in the GPS. For corresponding information between FIGS. 22 and 24, refer to the description of FIGS. 22 and 23.

smoothing_use_flag: signals whether smoothing is performed per unit.

smoothing_unit_def: defines the unit in which smoothing is to be applied (0: tile, 1: slice, 2: brick, 3: other definable data unit).

overlapping_region_exist_flag: signals whether overlapping of adjacent information occurs in each tile_partitioning_method.

smoothing_cancelation_flag: may signal a case where the encoder has signaled that smoothing should be performed, but the decoder does not perform smoothing per applied unit. (true=smoothing is not applied, false=smoothing is applied)

quantized_distance_xyz: may signal information about the degree of quantization or applied octree quantization per applied unit. The value of the smoothing applied geometry may be calculated based on the quantized_distance_xyz information. ([0]-x quantization interval, [1]-y quantization interval, [2]-z quantization interval).

geometry_smoothing_metadata_exit_flag: may signal the presence or absence of metadata for attribute information. When geomtry_smoothing_metadata_exit_flag=true, metadata_data_unit( ) may be defined and received in a bitstream.

metadata_data_unit: metadata_data_unit exists when geometry_smoothing_metadata_exit_flag=true. metadata_data_unit may be present in each parameter set, or may be present as a standalone data unit.

smoothing_clip_flag: Clipping of smoothing-applied geometry or attribute information may be performed. The offset and whd information about the geometry, the precision depth of the attribute, and the min/max signaling information about the attribute value are delivered.

FIG. 25 shows an attribute parameter set according to embodiments.

FIG. 25 is included in the bitstream of FIG. 21. Smoothing structure information according to the embodiments may be included in the APS. For the smoothing structure information of FIG. 25, which may correspond to the smoothing structure information of FIGS. 22 to 24, refer to the description of FIGS. 22 to 24.

smoothing_use_flag: signals whether smoothing is performed per unit.

smoothing_unit_def: defines the unit in which smoothing is to be applied (0: tile, 1: slice, 2: brick, 3: other definable data unit).

overlapping_region_exist_flag: signals whether overlapping of adjacent information occurs in each tile_partitioning_method.

smoothing_cancelation_flag: may signal a case where the encoder has signaled that smoothing should be performed, but the decoder does not perform smoothing per applied unit (true=smoothing is not applied, false=smoothing is applied).

quantized_distance_xyz: may signal information about the degree of quantization or applied octree quantization per applied unit. The value of the smoothing applied geometry may be calculated based on the quantized_distance_xyz information. ([0]-x quantization interval, [1]-y quantization interval, [2]-z quantization interval).

geometry_smoothing_metadata_exit_flag: may signal the presence or absence of metadata for attribute information. When geomtry_smoothing_metadata_exit_flag=true, metadata_data_unit( ) may be defined and received in a bitstream.

metadata_data_unit: metadata_data_unit exists when geometry_smoothing_metadata_exit_flag=true. metadata_data_unit may be present in each parameter set, or may be present as a standalone data unit.

smoothing_clip_flag: Clipping of smoothing-applied geometry or attribute information may be performed. The offset and whd information about the geometry, the precision depth of the attribute, and the min/max signaling information about the attribute value are delivered.

FIG. 26 shows a geometry data unit header according to embodiments.

FIG. 26 may be included in the bitstream of FIG. 21. A data unit may correspond to a slice. The geometry data unit header may correspond to a geometry slice header.

Smoothing structure information according to the embodiments may be included in the GSH. For the smoothing structure information of FIG. 26, which may correspond to the smoothing structure information of FIGS. 22 to 25, refer to the description of FIGS. 22 to 25.

smoothing_use_flag: signals whether smoothing is performed per unit.

smoothing_unit_def: defines the unit in which smoothing is to be applied (0: tile, 1: slice, 2: brick, 3: other definable data unit).

overlapping_region_exist_flag: signals whether overlapping of adjacent information occurs in each tile_partitioning_method.

smoothing_cancelation_flag: may signal a case where the encoder has signaled that smoothing should be performed, but the decoder does not perform smoothing per applied unit. (true=smoothing is not applied, false=smoothing is applied)

quantized_distance_xyz: may signal information about the degree of quantization or applied octree quantization per applied unit. The value of the smoothing applied geometry may be calculated based on the quantized_distance_xyz information ([0]-x quantization interval, [1]-y quantization interval, [2]-z quantization interval).

geometry_smoothing_metadata_exit_flag: may signal the presence or absence of metadata for attribute information. When geomtry_smoothing_metadata_exit_flag=true, metadata_data_unit( ) may be defined and received in a bitstream.

metadata_data_unit: metadata_data_unit exists when geometry_smoothing_metadata_exit_flag=true. metadata_data_unit may be present in each parameter set, or may be present as a standalone data unit.

smoothing_clip_flag: Clipping of smoothing-applied geometry or attribute information may be performed. The offset and whd information about the geometry, the precision depth of the attribute, and the min/max signaling information about the attribute value are delivered.

FIG. 27 shows a metadata unit according to embodiments.

FIG. 27 illustrates a metadata unit syntax in the case of generating smoothing-related metadata in FIG. 19.

metadata_data_unit: metadata_data_unit exists when geometry_smoothing_metadata_exit_flag=true. The metadata_data_unit may be present in each parameter set in the bitstream, or may be present as a standalone data unit.

rec_geom_diff_value: caries a geometry difference value between the reconstructed point cloud and the smoothing-applied point cloud. The difference may be entropy-encoded.

rec_attr_diff_value: carries the difference between the attribute values of the reconstructed point cloud and the smoothing-applied point cloud. The difference may be entropy-encoded.

FIG. 28 illustrates a method of transmitting point cloud data according to embodiments.

A method/device for transmitting point cloud data according to embodiments may correspond to the transmission device 10000, point cloud video encoder 10002, and transmitter 10003 of FIG. 1, the acquisition 20000-encoding 20001-transmission 20002 of FIG. 2, the encoder of FIG. 4, the transmission device of FIG. 12, the device of FIG. 14, the encoder of FIG. 19, and the like, and may encode and transmit point cloud data as shown in FIG. 28.

S2800: The method of transmitting point cloud data according to the embodiments may include encoding the point cloud data.

The encoding operation according to the embodiments may include operations of the transmission device 10000 and point cloud video encoder 10002 of FIG. 1, the encoding 20001 of FIG. 2, the encoder of FIG. 4, the transmission device of FIG. 12, the XR device of FIG. 14, the geometry smoothing of FIGS. 15 to 18, and the encoder of FIG. 19. According to embodiments, after the encoding, a bitstream containing the encoded point cloud data and signaling information of FIGS. 21 to 27 may be generated.

S2801: The method of transmitting point cloud data according to the embodiments may further include transmitting the bitstream containing the point cloud data.

The transmitting according to the embodiments may include the operations of the transmission device 10000 and transmitter 10003 of FIG. 1, the transmission 20002 of FIG. 2, the encoder of FIG. 4, the transmission device of FIG. 12, the XR device of FIG. 14, and the transmission of the bitstream containing the encoded point cloud data and signaling information of FIGS. 21 to 27.

FIG. 29 illustrates a method of receiving point cloud data according to embodiments.

A method/device for receiving point cloud data according to embodiments may correspond to the reception device 10004 receiver 10005, and point cloud video decoder 10006 of FIG. 1, the transmission 20002-decoding 20003-rendering 20004 of FIG. 2, the decoder of FIGS. 10 and 11, the reception device of FIG. 13, the device of FIG. 14, the decoder of FIG. 20, and the like, and may receive and decode point cloud data as shown in FIG. 29.

S2900: The point cloud data reception method according to the embodiments may include receiving a bitstream containing point cloud data.

The receiving according to the embodiments may include the operations of the reception device 10004 and receiver 10005 of FIG. 1, the reception according to the transmission of FIG. 2, the reception of the bitstream of FIGS. 10 and 11, the reception device of FIG. 13, the XR device of FIG. 14, the reception device of FIG. 20, and the reception of the bitstream of FIGS. 21 to 27.

S2901: The point cloud data reception method according to the embodiments may further include decoding the point cloud data.

The decoding according to the embodiments may include the operations of the reception device 10004 and point cloud video decoder 10006 of FIG. 1, the decoding of FIG. 2, the decoding of FIG. 12, the reception device of FIG. 13, the XR device of FIG. 14, the geometry smoothing of FIGS. 15 to 18, the reception device of FIG. 20, and the bitstream decoding of FIGS. 21 to 27.

A method of transmitting point cloud data according to embodiments may include encoding point cloud data, and transmitting a bitstream containing the point cloud data.

Regarding tile-to-tile, tile-to-slice, and slice-to-slice adjacencies (or overlaps) of FIG. 16, etc., according to embodiments, the point cloud data is represented by at least one of a tile, a slice, a brick, or an object. The tile includes a slice, wherein a first tile and a second tile including the point cloud data may be adjacent to each other or overlap. The first tile including the point cloud data may include a first slice and a second slice. The first slice may be adjacent to the second tile, and the first slice and the second slice may overlap.

Regarding slice smoothing signaling of FIG. 22 and tile smoothing signaling of FIG. 23 according to embodiments, the bitstream may include information indicating whether smoothing is applied to an adjacent slice. The bitstream may include information indicating whether smoothing is applied to an adjacent tile.

Regarding example geometry smoothing method 1 of FIG. 19, the encoding the point cloud data may include encoding geometry data of the point cloud data, smoothing the geometry data, and encoding attribute data of the point cloud data. Regarding example geometry smoothing method 2 of FIG. 19, the encoding the point cloud data may include encoding the geometry data of the point cloud data, and encoding the attribute data of the point cloud data, and the bitstream may include information indicating whether geometry smoothing is performed and information indicating a smoothing region of the unit of application of the smoothing. Regarding example geometry smoothing method 3 of FIG. 19, the encoding the point cloud data may include encoding the geometry data of the point cloud data, and encoding the attribute data of the point cloud data, and the bitstream may include information indicating a difference between the geometry data and a value obtained by applying smoothing to the geometry data.

A method of receiving point cloud data according to embodiments may include receiving a bitstream containing point cloud data, and decoding the point cloud data. The decoding the point cloud data may include decoding geometry data of the point cloud data, smoothing the geometry data, and decoding attribute data of the point cloud data. The decoding the point cloud data may include decoding the geometry data of the point cloud data, decoding the attribute data of the point cloud data, and smoothing the geometry data. The decoding the point cloud data may include decoding the geometry data of the point cloud data, and decoding the attribute data of the point cloud data, and the bitstream may include information indicating a difference between the geometry data and a value obtained by applying smoothing to the geometry data.

The amount of change in the geometry and attribute values of points between the slices may be large. A data edge face, for example, has regions where values of the data are extreme, and compressing this data as it is may increase the bitstream size. Recoloring according to the 2D video standard is to select representative colors arbitrarily, which has the disadvantage that correct values are not processed. Accordingly, embodiments may provide a technique for linearly modifying the positions of actual points on data boundaries to compress and reconstruct the data, which may provide higher compression performance and accuracy.

The PCC encoding methods, PCC decoding methods, and signaling methods of the above-described embodiments may provide the following effects.

Embodiments may increase the efficiency of geometry visual quality, and may have the effect of aligning non-aligned points on a boundary surface within a defined unit. In addition, the overall visual quality may be increased with lower computational complexity between region ranges that are quantized differently in different units. Uniform setting of geometry position values may affect attribute coding, enabling a power-of-two representation of point positions in a region. Thus, the efficiency of attribute coding compression in lossy compression may be increased.

Embodiments support a method of partitioning data into slices to allow for the application of an angular mode to support efficient geometry compression of 3D map data captured by lidar equipment and aggregated into a single piece of content.

Thus, embodiments may provide a method for dividing point cloud frames captured by lidar equipment into slices for efficient geometry compression in Geometry-based Point Cloud Compression (G-PCC) when the frames are integrated into a single piece of point cloud content, thereby increasing geometry compression coding/decoding efficiency.

The point cloud data transmission and reception methods/devices according to embodiments have the effect of more efficiently compressing and reconstructing point cloud data based on the operation of partitioning point cloud data captured by LiDAR equipment based on a 3D map and related signaling information.

Therefore, the transmission method/device according to the embodiments may efficiently compress the point cloud data, transmit the data, and deliver the signaling information therefor, such that the reception method/device according to the embodiments may efficiently decode/reconstruct the point cloud data.

The operation of the transmission and reception devices according to the embodiments may be described in conjunction with the following point cloud compression processing.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "I" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/ or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of encoding point cloud data, the method comprising:
    encoding geometry data of point cloud data in a slice,
    wherein the geometry data is adjusted based on a first offset for the slice;
    encoding attribute data of the point cloud data in the slice,
    wherein the attribute data is adjusted based on a second offset for the slice; and
    transmitting a bitstream containing the point cloud data,
    wherein the bitstream includes parameter information related to the first offset, and parameter information related to the second offset.

2. The method of claim 1, wherein the point cloud data is represented by at least one of a tile, a slice, a brick, or an object, wherein the tile comprises the slice,
    wherein the tile comprises a first tile and a second tile, the first and second tiles containing the point cloud data and being adjacent to or overlapping each other,
    wherein the first tile containing the point cloud data comprises a first slice and a second slice, the first slice being adjacent to the second tile,
    wherein the first slice and the second slice overlap each other.

3. The method of claim 2, wherein the bitstream contains information indicating whether smoothing is applied to the adjacent slices,
    wherein the bitstream contains information indicating whether the smoothing is applied to the adjacent tiles.

4. The method of claim 1,
    wherein the bitstream contains:
    information indicating whether geometry smoothing is performed; and
    information indicating a smoothing region of a unit of application of the smoothing.

5. The method of claim 1,
    wherein the bitstream contains information indicating a difference between the geometry data and a value obtained by applying smoothing to the geometry data.

6. A device for encoding point cloud data, comprising:
    a memory; and
    at least one processor connected to the memory, the at least one processor is configured to:
    encoding geometry data of point cloud data in a slice,
    wherein the geometry data is adjusted based on a first offset for the slice;
    encoding attribute data of the point cloud data in the slice,
    wherein the attribute data is adjusted based on a second offset for the slice; and
    transmitting a bitstream including the point cloud data,
    wherein the bitstream includes parameter information related to the first offset, and parameter information related to the second offset.

7. The device of claim 6, wherein the point cloud data is represented by at least one of a tile, a slice, a brick, or an object, wherein the tile comprises the slice,
    wherein the tile comprises a first tile and a second tile, the first and second tiles containing the point cloud data and being adjacent to or overlapping each other,
    wherein the first tile containing the point cloud data comprises a first slice and a second slice, the first slice being adjacent to the second tile,
    wherein the first slice and the second slice overlap each other.

8. The device of claim 7, wherein the bitstream contains information indicating whether smoothing is applied to the adjacent slices,
    wherein the bitstream contains information indicating whether the smoothing is applied to the adjacent tiles.

9. The device of claim 6,
    wherein the bitstream contains:
    information indicating whether geometry smoothing is performed; and
    information indicating a smoothing region of a unit of application of the smoothing.

10. The device of claim 6,
    wherein the bitstream contains information indicating a difference between the geometry data and a value obtained by applying smoothing to the geometry data.

11. A method of decoding point cloud data, the method comprising:
    receiving a bitstream including point cloud data;
    decoding geometry data of point cloud data in a slice,
    wherein the geometry data is adjusted based on a first offset for the slice; and
    decoding attribute data of the point cloud data in the slice,
    wherein the attribute data is adjusted based on a second offset for the slice; and
    wherein the bitstream includes parameter information related to the first offset, and parameter information related to the second offset.

12. The method of claim 11, wherein the point cloud data is represented by at least one of a tile, a slice, a brick, or an object, wherein the tile comprises the slice,
    wherein the tile comprises a first tile and a second tile, the first and second tiles containing the point cloud data and being adjacent to or overlapping each other, wherein the first tile containing the point cloud data comprises a first slice and a second slice, the first slice being adjacent to the second tile, wherein the first slice and the second slice overlap each other.

13. The method of claim 11, wherein the bitstream contains information indicating whether smoothing is applied to the adjacent slices, wherein the bitstream contains information indicating whether the smoothing is applied to the adjacent tiles.

14. The method of claim 11, wherein the decoding the geometry data includes:

smoothing the geometry data.

15. The method of claim 11, wherein the bitstream contains information indicating a difference between the geometry data and a value obtained by applying smoothing to the geometry data.

16. A device of decoding point cloud data, the device comprising:

a memory; and at least one processor connected to the memory, the at least one processor is configured to:

receive a bitstream including point cloud data;

decode geometry data of point cloud data in a slice, wherein the geometry data is adjusted based on a first offset for the slice; and decode attribute data of the point cloud data in the slice, wherein the attribute data is adjusted based on a second offset for the slice; and wherein the bitstream includes parameter information related to the first offset, and parameter information related to the second offset.

17. The device of claim 16, wherein the point cloud data is represented by at least one of a tile, a slice, a brick, or an object, wherein the tile comprises the slice, wherein the tile comprises a first tile and a second tile, the first and second tiles containing the point cloud data and being adjacent to or overlapping each other, wherein the first tile containing the point cloud data comprises a first slice and a second slice, the first slice being adjacent to the second tile, wherein the first slice and the second slice overlap each other.

* * * * *